(12) United States Patent
Kimoto et al.

(10) Patent No.: US 10,948,809 B2
(45) Date of Patent: Mar. 16, 2021

(54) IMAGE PROJECTION APPARATUS, ITS CONTROL METHOD, AND STORAGE MEDIUM

(71) Applicant: CANON KABUSHIKI KAISHA, Tokyo (JP)

(72) Inventors: Tatsuya Kimoto, Utsunomiya (JP); Ikuo Takanashi, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 58 days.

(21) Appl. No.: 16/229,221

(22) Filed: Dec. 21, 2018

(65) Prior Publication Data

US 2019/0196310 A1 Jun. 27, 2019

(30) Foreign Application Priority Data

Dec. 27, 2017 (JP) .............................. JP2017-251411

(51) Int. Cl.
*G03B 21/14* (2006.01)
*H04N 9/31* (2006.01)
(Continued)

(52) U.S. Cl.
CPC ............. *G03B 21/147* (2013.01); *G03B 9/00* (2013.01); *G03B 21/2053* (2013.01);
(Continued)

(58) Field of Classification Search
CPC .... G03B 21/2053; G03B 9/00; G03B 21/147; H04N 9/3194; H04N 9/3155; H04N 9/3182; H04N 1/6033
See application file for complete search history.

(56) References Cited

U.S. PATENT DOCUMENTS 7,055,966 B2    6/2006  Momose et al.
7,748,854 B2 *  7/2010  Sugino .............. G03B 21/2053
                                                        353/97
(Continued)

FOREIGN PATENT DOCUMENTS

CN    102955336 A    3/2013
CN    107430320 A    12/2017
(Continued)

OTHER PUBLICATIONS

Extended European Search Report issued in European Application No. 18215527.5 dated Oct. 18, 2019.
(Continued)

*Primary Examiner* — Brenda C Bernardi
(74) *Attorney, Agent, or Firm* — Rossi, Kimms & McDowell LLP (57) ABSTRACT

An image projection apparatus includes an optical element configured to change a light amount of light emitted from the light source, an information acquirer configured to acquire information on a gradation of the image signal, a corrector configured to correct the image signal in accordance with a change in the light amount, and a controller configured to correct the image signal based on at least one of first correction data used to correct the image signal in accordance with the change in the light amount caused by controlling the optical element, and second correction data used to correct the image signal in accordance with the change in the light amount caused by controlling the supply power.

10 Claims, 3 Drawing Sheets

(51) Int. Cl.
*H04N 1/60* (2006.01)
*G03B 21/20* (2006.01)
*G03B 9/00* (2006.01)

(52) U.S. Cl.
CPC ......... *H04N 1/6033* (2013.01); *H04N 9/3155* (2013.01); *H04N 9/3182* (2013.01); *H04N 9/3194* (2013.01)

(56) References Cited

U.S. PATENT DOCUMENTS

| | | |
|---|---|---|
| 2003/0020884 A1 | 1/2003 | Okada |
| 2003/0112378 A1 | 6/2003 | Okunuki et al. |
| 2010/0073639 A1* | 3/2010 | Shibasaki ............... H05B 45/22 353/31 |
| 2013/0044297 A1 | 2/2013 | Horiguchi et al. |
| 2015/0015470 A1 | 1/2015 | Jiko |
| 2017/0324939 A1 | 11/2017 | Fan |

FOREIGN PATENT DOCUMENTS

| | | |
|---|---|---|
| JP | 2004264819 A | 9/2004 |
| JP | 2012103642 A | 5/2012 |
| JP | 2013168836 A | 8/2013 |

OTHER PUBLICATIONS

Partial European Search Report issued in European Appln. No. 18215527.5 dated May 23, 2019.
Office Action issued in Chinese Application No. 201811585701.0 dated Dec. 25, 2020. English translation provided.

* cited by examiner

IMAGE PROJECTION APPARATUS, ITS CONTROL METHOD, AND STORAGE MEDIUM

BACKGROUND OF THE INVENTION

Field of the Invention

The present invention relates to an image projection apparatus (referred to as a "projector" hereinafter) which modulates light from a light source through an optical modulator, and projects the modulated light.

Description of the Related Art

Some projectors improve the contrast of a projection image by adjusting a light amount entering an optical modulator from a light source in accordance with an input image signal. Japanese Patent Laid-Open No. ("JP") 2013-168836 discloses a projector that dynamically controls a diaphragm in accordance with an input image signal and corrects a color unbalance in a projection image associated with a light amount change then.

However, JP 2013-168836 is silent about a spectral change of light emitted from the light source in changing the light amount of the light source itself. Hence, when the diaphragm control and the light amount control of the light source work simultaneously, the image quality degradation caused by the color change cannot be fully corrected.

SUMMARY OF THE INVENTION

The present invention provides an image projection apparatus configured to improve the contrast by properly associating a control of an optical element, such as a diaphragm, and a control of a light source with each other.

An image projection apparatus according to the present invention includes an optical modulator configured modulate light from a light source according to an image signal, the image projection apparatus projecting light modulated by the optical modulator and displays an image, an optical element configured to change a light amount of light emitted from the light source, an information acquirer configured to acquire information on a gradation of the image signal, a corrector configured to correct the image signal in accordance with a change in the light amount, and a controller configured to set an allocation of the light amount to the optical element and the light source based on the information on the gradation, and to control the optical element and supply power to the light source in accordance with the allocation. The corrector corrects the image signal based on at least one of first correction data used to correct the image signal in accordance with the change in the light amount caused by controlling the optical element, and second correction data used to correct the image signal in accordance with the change in the light amount caused by controlling the supply power.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
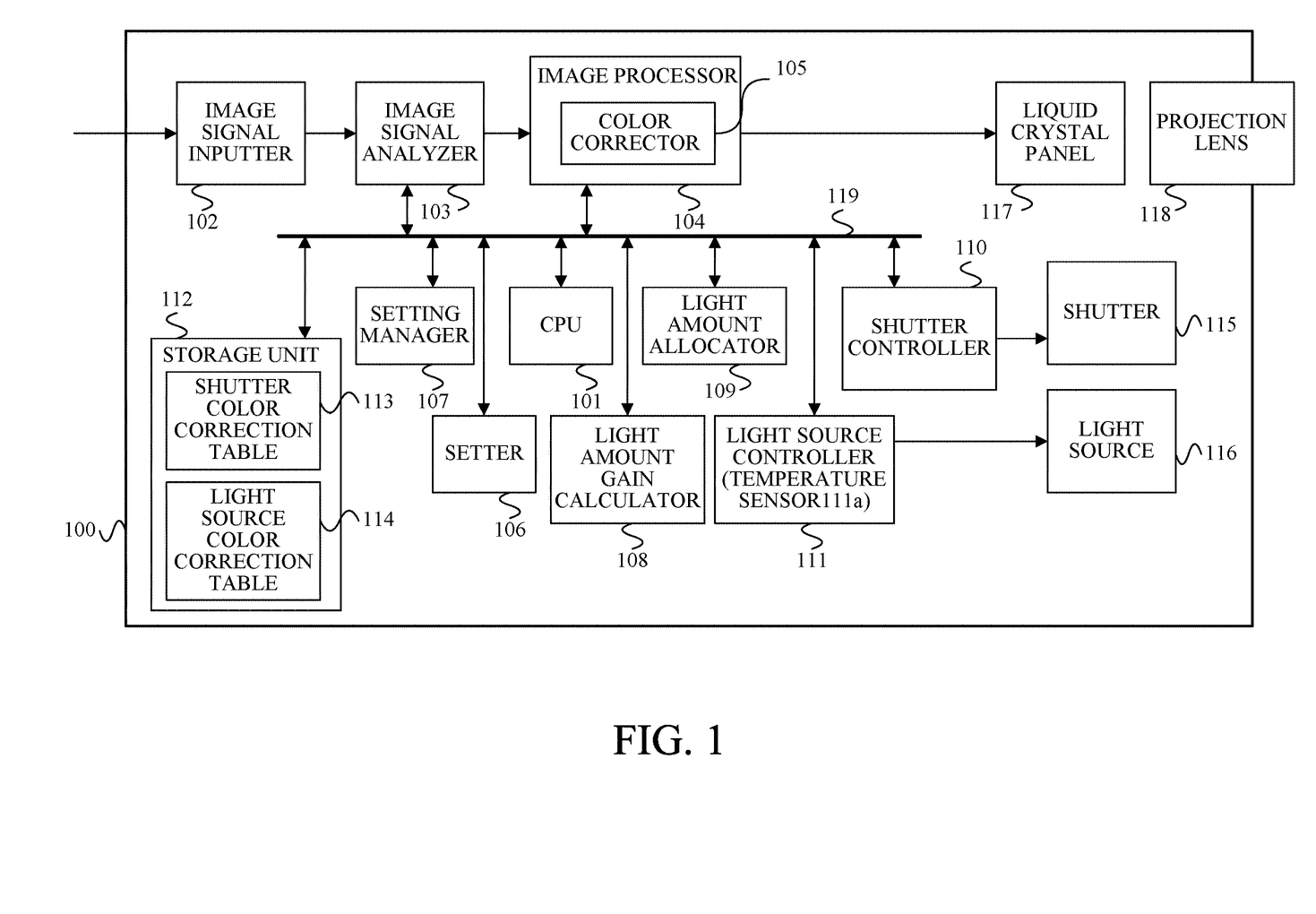
FIG. 1 is a block diagram illustrating a configuration of a projector according to a first embodiment and a second embodiment of the present invention.

FIG. 1 illustrates a configuration of a projector (image projection apparatus) 100 according to a first embodiment of the present invention. The projector 100 according to this embodiment uses a liquid crystal panel as an optical modulator. However, the optical modulator may use a digital micromirror device.

The projector 100 includes a CPU 101, an image signal inputter 102, an image signal analyzer 103, an image processor 104, a color corrector 105, a setter 106, and a setting manager 107. The projector 100 further includes a light amount gain calculator 108, a light amount allocator 109, a shutter controller 110, a light source controller 111, and a storage unit 112. The projector 100 further includes a shutter (diaphragm) 115, a light source 116, a liquid crystal panel 117, and a projection lens 118. These components and devices are connected to each other so as to be able to exchange information and signals with each other through an internal bus 119 such as a control bus and a data bus.

The CPU 101 controls the overall operation of the projector 100 according to a computer program stored in the storage unit 112. The image signal inputter 102 is connected to an image data output device such as a personal computer or a video player via a video interface or the like, receives the image signal output from the image data output device, and supplies the received image signal to the image signal analyzer 103. The video interface includes, for example, HDMI (registered trademark), DVI, DisplayPort, and the like.

The image signal analyzer (information acquirer) 103 detects the signal level (gradation or brightness level) in the image signal supplied from the image signal inputter 102. The image signal analyzer 103 detects, for example, an APL (Average Picture Level) value for each frame in the image signal as information (statistic amount) on the gradation (or brightness) in the image data. The APL value is an averaged value of the signal levels (or averaged gradation level). When the image signal is bright (high gradation), the signal level becomes high and has a large value, and when the image signal is dark (low gradation), the signal level becomes low and has a small value. The image signal analyzer 103 supplies the image signal to the image processor 104 and supplies the detected APL value to the light amount gain calculator 108. In this description, the image signal analyzer 103 according to the first embodiment detects the APL value in the image signal. However, it may detect a histogram (gradation histogram) indicating the signal level distribution and a WP (white peak) value as the maximum gradation value as information on the gradation (statistic amount).

The image processor 104 performs processing for converting the image signal supplied from the image signal analyzer 103 into image data in a format displayable ed on the liquid crystal panel 117. The image processor 104 includes a color corrector 105. The color corrector 105 is an image processing block for correcting the signal level of the image signal. The color corrector 105 corrects the image signal by applying the gain value calculated by the color correction value calculation method described later to the image signal (or by multiplying the image signal by the gain value), and by supplying the corrected image signal to the liquid crystal panel 117.

The setter 106 has an operation member, such as a button, attached to the exterior of the projector 100. The user sets each function of the projector 100 by displaying the OSD menu and by operating the menu through the setter 106. The setter 106 may be a jog dial, a touch sensor, or the like, or may be operated externally via wired or wireless communications with a remote controller. The setter 106 may directly set information using a network command or the like, without operating the button or the like or without displaying the OSD menu. The setting manager 107 is informed of the information on the user operation to the setter 106.

The setting manager 107 manages the user set value for each function of the projector 100 and the presence or absence of change in accordance with the user operation information into the setter 106. The setting manager 107 reads (acquires) a current user set value of each function of the projector 100 from the storage unit 112. If the setting manager 107 determines that the user set value has been changed based on the user operation information into the setter 106, the setting manager 107 reflects the change and stores the change in the storage unit 112. The user set value for each function of the projector 100 includes at least a user set value concerning the brightness (referred to as a "user brightness set value" hereinafter). The user brightness set value is a user set value in a function capable of changing the brightness of the entire image at a predetermined stage. The setter 106 and the setting manager 107 constitute an acquirer.

Figure 2:
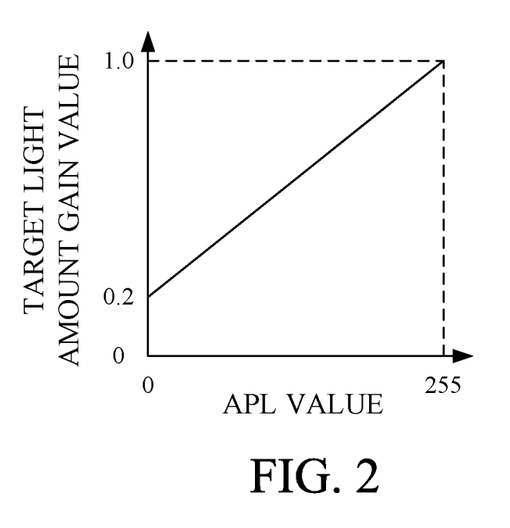
FIG. 2 illustrates a relationship between an APL value and a target light amount gain value according to the first and second embodiments.

The light amount gain calculator 108 sets the target light amount gain value according to the APL value detected by the image signal analyzer 103. FIG. 2 illustrates a relationship between the APL value and the target light amount gain value. In FIG. 2, the abscissa axis represents the APL value and the ordinate axis represents the target light amount gain value. In FIG. 2, when the APL value is low, or when the image signal has a low signal level and the image signal is a dark image, the target light amount gain value has a small value. When the APL value is high or when the image signal has a high signal level and the image signal is a bright image, the target light amount gain value has a large value. In other words, the target gain value increases as the APL value increases. The light amount gain calculator 108 supplies the set target light amount gain value to the light amount allocator 109.

The light amount allocator 109 sets a target light amount adjustment value as a target value relating to the light amount in accordance with the user brightness set value read from the storage unit 112 and the target light amount gain value supplied from the light amount gain calculator 108 (or the APL value as information on the gradation (statistical amount)). The light amount allocator 109 sets light amount allocations to the shutter 115 and the light source 116 for realizing the set target light amount adjustment value, and supplies the shutter light amount adjustment value and the light source light amount adjustment value to the shutter controller 110 and the light source controller 111 in accordance with the light amount allocation. The user brightness set value is used so as to set the target light amount adjustment value within the user preset brightness. The light amount allocator 109 also supplies the shutter light amount adjustment value and the light source light amount adjustment value to the image processor 104.

The light amount allocation setting method will be described later. This embodiment uses the target light amount adjustment value as the target value relating to the light amount, but may use various values as the target value regarding the light amount.

The shutter controller 110 controls the operation of the shutter 115 as the light amount changer according to the shutter light amount adjustment value supplied from the light amount allocator 109. Thereby, a light shield amount in the light from the light source 116 is changed, and the light amount entering the liquid crystal panel 117 is changed.

The light source controller 111 changes the light amount output from the light source 116 by controlling the supply power (supply voltage or supply current) to the light source 116 according to the light source light amount adjustment value supplied from the light amount allocator 109. The light source controller 111 serves as a degradation detector that detects the degradation due to aged deterioration or the like of the light source 116, increases the supply power when the degradation is detected, and suppresses an output light amount of the light source 116 (or the light amount entering the liquid crystal panel 117) from being decreased. In detecting the degradation of the light source 116, the storage unit 112 first stores a measurement value of the initial brightness of the light source 116 by a luminance sensor, a color sensor, or the like (light amount detector) with a predetermined supply power. Thereafter, by periodically comparing the actual brightness measurement value at the predetermined supply power with the initial brightness measurement value, it is detected whether the former is lower than the latter by a predetermined value or more. In other words, the deterioration of the light source is detected by detecting whether the light amount has decreased at a predetermined supply power.

The CPU 101, the light amount gain calculator 108, the light amount allocator 109, the shutter controller 110, and the light source controller 111 constitute a controller.

The storage unit 112 includes a nonvolatile memory, such as an EEPROM and a flash memory. The storage unit 112 further includes a volatile memory serving as a work area of the CPU 101. The nonvolatile memory stores a computer program for controlling set values of respective functions of the projector 100 and the overall operation of the projector 100. The nonvolatile memory stores a shutter color correction table (first correction data) 113 and a light source color correction table (second correction data) 114.

The shutter color correction table 113 stores data for correcting the image signal so as to prevent a color change in the projection image even if the spectrum of the light is changed as the shutter 115 shields the light output from the light source 116. The light source color correction table 114 is a data table that stores data for correcting the image signal so as to prevent a color change in the projection image even if the spectrum of light changes as the power supplied to the light source 116 changes and the light amount output from the light source 116 changes.

The shutter 115 includes a light shielding member, such as one or more of shutter blades (diaphragm blades), and a pulse actuator, such as a stepping motor, for driving the shutter blade, and the shutter controller 110 controls the pulse actuator such that the light shielding member is driven. The light amount passing through the shutter 115 varies according to the position of the light shielding member (opening amount by the light shielding member). The light having passed through the shutter 115 enters the liquid crystal panel 117.

The light source 116 includes a lamp, such as a high-pressure mercury lamp, a halogen lamp, and a metal halide lamp, an LED (Light Emitting Diode), or a light emitting body, such as a semiconductor laser, and is controlled by the light source controller 111. The white light from the light source 116 is color-separated into light of three colors (RGB) by an unillustrated color separation optical system, and the R light, the G light, and the B light that are color-separated, enter the liquid crystal panel 117 (although a single liquid crystal panel is illustrated, actually three liquid crystal panels are provided for R, G, and B). Each of the R, G, and B liquid crystal panels (117) has a plurality of pixels and modulates the incident light for each pixel according to the signal level of the image data supplied from the image processor 104. The R light, the G light, and the B light modulated by the R, G and B liquid crystal panels (117) are combined by an unillustrated color combining optical system, and the combined light is projected by the projection lens 118 onto a target surface, such as a screen. Thereby, a projection image as a full-color image is displayed. The projection lens 118 has a focusing function and a zooming function, and the focus control and zoom control are performed by the CPU 101.

In the thus-configured projector 100 according to this embodiment, where the image signal is entirely dark, the APL value detected by the image signal analyzer 103 decreases, the light amount adjustment value calculated by the light amount allocator 109 is small, and the light amount entering the liquid crystal panel 117 decreases. Hence, a dark image signal is displayed as a darker projection image. When the image signal is entirely bright, the APL value detected by the image signal analyzer 103 increases, the light amount adjustment value calculated by the light amount allocator 109 increases, and the light amount entering the liquid crystal panel 117 increases. Therefore, a bright image signal is displayed as a brighter projection image.

Next follows a description of a method for setting the light amount allocation to the shutter 115 and the light source 116 according to this embodiment. The light amount allocator 109 calculates, as the target light amount adjustment value, a gain value by multiplying the user brightness set value read from the storage unit 112 by the target light amount gain value supplied from the light amount gain calculator 108. Then, the light amount allocator 109 determines whether the calculated target light amount adjustment value is equal to or higher than a predetermined value (such as 50% (0.5)), and if so, allocates the light amount only to the shutter 115 through the shutter controller 110. On the other hand, when the calculated light amount adjustment value is less than the predetermined value, the light amount allocator 109 allocates the light amount up to the predetermined value to the shutter 115, and the light amount corresponding to a difference from the predetermined value to the light source 116 through the light source controller 111. Where Actrl is a total target light amount adjustment value, Sctrl is a shutter light amount adjustment value, Lctrl is a light source light amount adjustment value, and Th is a predetermined value, the light amount allocator 109 sets Sctrl and Lctrl as follows.

If $Th \leq Actrl$, then $Sctrl = Actrl$ and $Lctrl = 1.0$.

If $Th > Actrl$, $Sctrl = Th$ and $Lctrl = Actrl/Th$.

The settings of Sctrl and Lctrl described here are merely illustrative, and another light amount allocation may be performed. A data table storing the allocation data of Sctrl and Lctrl according to the target light amount adjustment value may be used to set the light amount allocation.

Figure 3A:
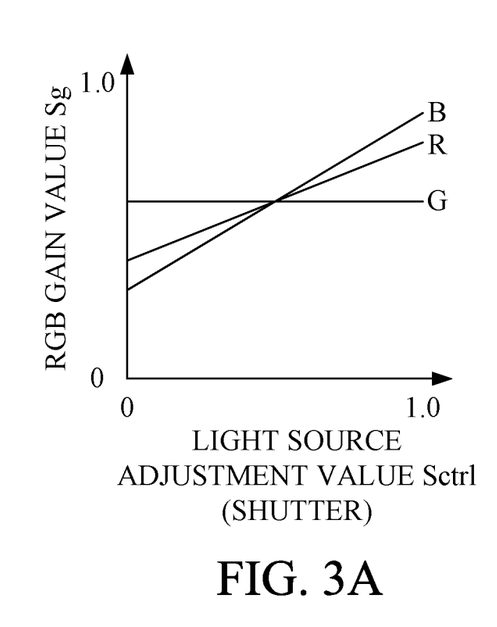
FIGS. 3A and 3B illustrate examples of a shutter color correction table and a light source color correction table according to the first and second embodiments.
Figure 3B:
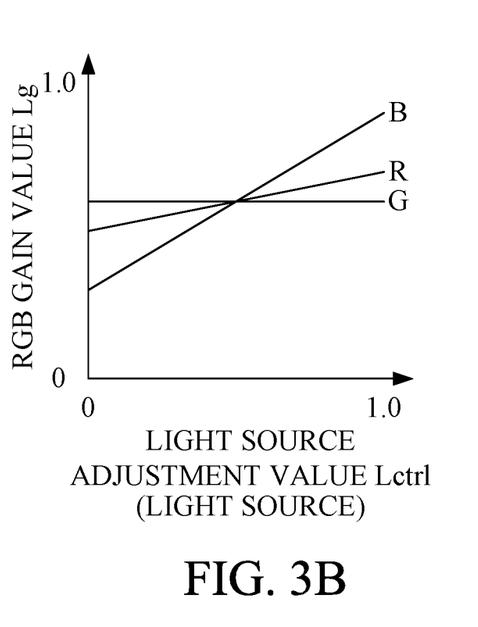

Referring now to FIG. 3, a description will be given of a method of calculating a color correction value according to this embodiment. FIG. 3 illustrates examples of the shutter color correction table 113 (FIG. 3A) and the light source color correction table 114 (FIG. 3B) stored in the storage unit 112. When receiving the shutter light amount adjustment value Sctrl, the color corrector 105 calculates gain values (referred to as "shutter RGB gain values" hereinafter) Sg for R, G, and B as color correction values using the shutter color correction table 113. When receiving the light source light amount adjustment value Lctrl from the light amount allocator 109, the color corrector 105 calculates the light source RGB gain values Lg as the color correction values using the light source color correction table 114. The color corrector 105 corrects colors through image processing by multiplying the image signal by Sg and Lg.

Referring now to a flowchart of FIG. 4, a description will be given of processing performed by the CPU 101 according to this embodiment. This processing controls the brightness in the projection image to be displayed and corrects the color according to the brightness in the image signal input to the projector 100. When the projector 100 is powered on, the CPU 101 executes this processing by executing a control program as a computer program stored in the storage unit 112. The CPU 101 steadily performs this processing while an image signal is input to the image signal inputter 102.

In S (Step) 101, the CPU 101 instructs the image signal analyzer 103 to detect the APL value in the image signal supplied from the image signal inputter 102. The image signal analyzer 103 detects the APL value in the image signal and supplies the detected APL value to the light amount gain calculator 108. Thus, the CPU 101 proceeds to S102.

In S102, the CPU 101 instructs the light amount gain calculator 108 to set the target light amount gain value. The light amount gain calculator 108 sets the target light amount gain value according to the APL value supplied from the image signal analyzer 103, and supplies it to the light amount allocator 109. Thereafter, the CPU 101 proceeds to S103.

In S103, the CPU 101 instructs the light amount allocator 109 to set the light amount allocation to the shutter 115 and the light source 116. The light amount allocator 109 sets the light amount allocation in accordance with the above light amount allocation setting method, supplies the shutter light amount adjustment value and the light source light amount adjustment value to the shutter controller 110 and the light source controller 111, respectively, and supplies the shutter light amount adjustment value and the light source light amount adjustment value to the image processor 104. Thereafter, the CPU 101 proceeds to S104.

In S104, the CPU 101 instructs the shutter controller 110 to control the shutter 115 and instructs the light source controller 111 to control the light source 116. The shutter controller 110 controls the shutter 115 according to the shutter light amount adjustment value supplied from the light amount allocator 109. The light source controller 111 controls the supply power to the light source 116 according to the light source light amount adjustment value supplied from the light amount allocator 109. Thereafter, the CPU 101 proceeds to S105.

In S105, the CPU 101 instructs the image processor 104 to calculate the color correction value. The color corrector 105 in the image processor 104 reads the shutter color correction table 113 and the light source color correction table 114 out of the storage unit 112 and calculates the color correction value according to the above color correction value calculation method. Thereafter, the CPU 101 proceeds to S106.

In S106, the CPU 101 instructs the image processor 104 to correct a color through the image processing. The color corrector 105 in the image processor 104 corrects the color for the image signal supplied from the image signal analyzer 103 by using the color correction value calculated in S105 and supplies the color-corrected image signal to the liquid crystal panel 117. Thereafter, the CPU 101 ends this process.

In controlling the light amount entering the liquid crystal panel 117, this embodiment can improve the contrast of the projection image by properly associating the control of the shutter 115 and the control of the light source 116 with each other in accordance with the user brightness set value and the APL value in the image signal. Then, a proper color correction can be performed for the image signal. This configuration can suppress the image quality degradation by a color change along with a change in the light amount from the light source 116.

This embodiment changes a light amount allocation in accordance with whether the target light amount adjustment value is equal to or larger than the predetermined value, but may use another setting method. For example, this embodiment may set the light amount allocation of the light source 116 so as to compensate the operation resolution of the shutter 115, or set the light amount allocation to the shutter 115 so as to compensate for the light amount resolution of the light source 116. This embodiment may allocate the light amount only to the shutter 115 when the target light amount adjustment value is equal to or larger than the predetermined value, and set, when the target light amount adjustment value is less than the predetermined value, the light amount corresponding to the predetermined value to the shutter 115 and the light amount corresponding to a difference from the predetermined value to the light source 116. When the target light amount adjustment value is equal to or larger than the predetermined value, the light amount is allocated only to the light source 116. When the target light amount adjustment value is less than the predetermined value, the light amount corresponding to the predetermined value may be allocated to the light source 116 and the light amount corresponding to a difference from the predetermined value may be allocated to the shutter 115.

Figure 4:
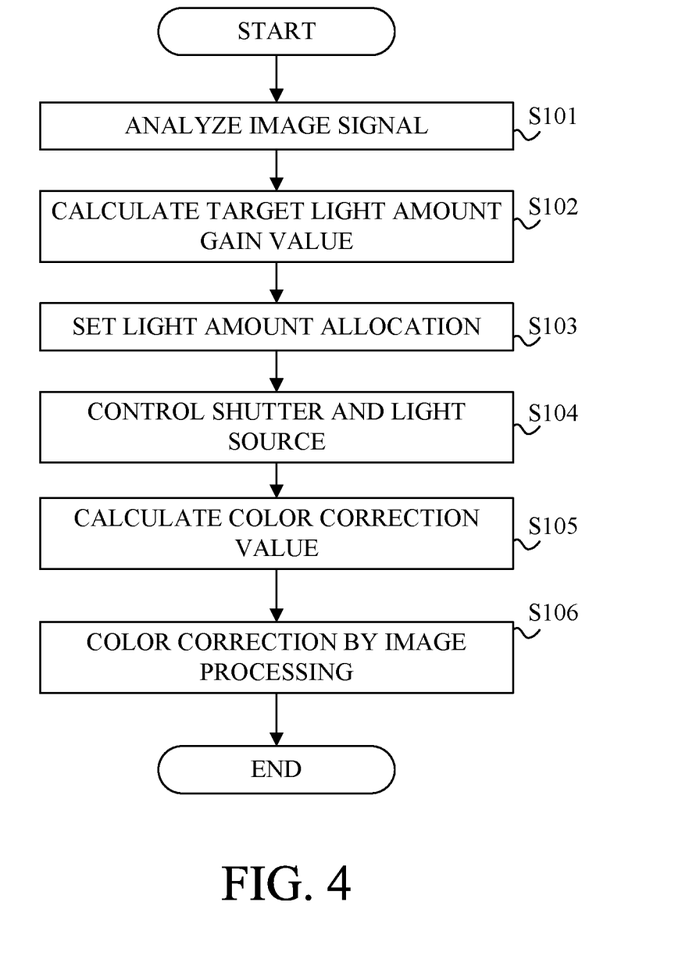
FIG. 4 is a flowchart illustrating processing performed in the first and second embodiments.

The order of S104 and S105 in the flowchart in FIG. 4 may be reversed, or they may be performed in parallel.

When detecting the deterioration of the light source 116, this embodiment increases the power supplied to the light source 116 and suppresses a decrease in the light amount entering the liquid crystal panel 117. However, this embodiment may increase the opening amount of the shutter 115 and suppress a decrease in the light amount entering the liquid crystal panel 117 through the shutter controller 110 when detecting the deterioration. This embodiment may increase the supply power to the light source 116 and the opening amount of the shutter 115.

This embodiment uses the shutter 115 for driving the light shielding member so as to change the light amount emitted from the light source 116, but may use an optical element configured to change the transmission light amount like a liquid crystal element.

Second Embodiment

Next follows a projector according to a second embodiment of the present invention. The projector according to this embodiment has the same configuration as that of the first embodiment.

In the first embodiment, the color corrector 105 corrects a color in accordance with the shutter light amount adjustment value and the light source light amount adjustment value set by the light amount allocator 109. When the temperature inside the projector excessively rises, it is necessary to lower the output light amount from the light source 116 in order to prevent the projector from being broken. Since there is a shift between the light source light amount adjustment value set by the light amount allocation unit 109 and the output light amount from the light source 116, a properly color-corrected projection image cannot be obtained even when the color corrector 105 performs the color correction for the image signal according to the light source light amount adjustment value.

It may take a time to control the shutter 115 due to the degradation over time of the actuator configured to drive the shutter 115 and as a result, the proper color correction is not performed for a period.

Accordingly, this embodiment solves these problems by performing the following processing different from the first embodiment.

As described in the first embodiment, the light amount allocator 109 supplies the shutter light amount adjustment value and the light source light amount adjustment value to the shutter controller 110 and the light source controller 111, respectively, but not to the image processor 104. In addition to the control of the shutter 115 described in the first embodiment, the shutter controller 110 detects the position of the light shielding member in the controlled shutter 115 (opening amount of the shutter 115), and calculates the shutter light amount adjustment value based on the detection position (opening amount). Then, a sensor for detecting the position (opening state) of the light shielding blade in the shutter 115 may be provided, or the current position of the light shielding blade may be calculated based on a predetermined time constant calculated from the performance of the actuator for the shutter 115. The shutter controller 110 supplies the calculated shutter light amount adjustment value to the image processor 104.

The light source controller 111 including a temperature sensor (temperature detector) 111a illustrated in parentheses in FIG. 1 detects the current internal temperature of the projector 100, and reduces the power supplied to the light source 116 and reduces its output light amount when the detected internal temperature is equal to or higher than the predetermined temperature. For example, when the detected internal temperature is 75° C. or higher, the light source light amount adjustment value is reduced by 0.5 times, thereby the internal temperature is prevented from further rising. The light source controller 111 supplies the light source light amount adjustment value reduced by an amount corresponding to the control lag or the corrected light source light amount adjustment value to the image processor 104.

The light amount allocation setting method, the color correction value calculating method, and the processing flow according to this embodiment are common to those of the first embodiment except for a different supplier of the light source light amount adjustment value used by the color corrector 105.

It may take a time to control the shutter 115, and it may take a time to control the light source 116 in some cases.

Then, the light source controller 111 calculates the light source light amount adjustment value reduced by an amount corresponding to a control lag of the light source 116 or the corrected light source light amount adjustment value, and supplies it to the image processor 104.

In this embodiment, the light source controller 111 detects the internal temperature of the projector 100, but the shutter controller 110 may detect the internal temperature of the projector 100. When the detected internal temperature is equal to or higher than the predetermined temperature, the shutter controller 110 decreases the internal temperature of the projector 100 by increasing the opening amount in the shutter 115 and by decreasing the light amount irradiated onto the light shielding member of the shutter 115. Then, the shutter controller 110 supplies to the image processor 104 the shutter light amount adjustment value increased by an amount corresponding to the increased aperture amount of the shutter 115 or the corrected shutter light amount adjustment value.

When the shutter controller 110 or the light source controller 111 controls the operation of the shutter 115 or the supply current to the light source 116 so as to decrease the internal temperature or the like, this embodiment corrects the shutter light amount adjustment value or the light source light amount adjustment value and supplies it to the image processor 104. In other words, this embodiment controls at least one of the operation of the shutter 115 and the supply current to the light source 116, and changes the light amount allocation according to the control. This configuration can improve the color correction accuracy for the image signal.

The above embodiments can improve the contrast of the projection image by associating the control of the optical element and the control of the light source with each other according to the user set value and the information on the gradation of the image signal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), micro processor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-251411, filed on Dec. 27, 2017, which is hereby incorporated by reference herein in its entirety.

What is claimed is:

1. An image projection apparatus comprising:
an optical modulator configured to modulate light from a light source according to an image signal, the image projection apparatus being capable of projecting light modulated by the optical modulator to display an image;
an optical element configured to change a light amount emitted from the light source; and
a processor configured to:
acquire information on a gradation of the image signal;
correct the image signal; and
control the light source and the optical element based on the information on the gradation;
wherein the processor corrects the image signal based on first correction data used to correct the image signal in accordance with a change in a light amount caused by controlling the optical element and second correction data used to correct the image signal in accordance with a change in a light amount caused by controlling the light source.

2. The image projection apparatus according to claim 1, wherein the processor is further configured to acquire a user set value relating to a brightness of the image,
wherein the processor sets a target value relating to a light amount according to the user set value and information on the gradation, and changes a light amount emitted from the light source by controlling the light source and a light amount emitted from the light source by controlling the optical element based on the target value.

3. The image projection apparatus according to claim 2, wherein the processor changes the light amount emitted from the light source by controlling the light source and the light amount emitted from the light source by controlling the optical element between when the target value is larger than a predetermined value and when the target value is smaller than the predetermined value.

4. The image projection apparatus according to claim 1, wherein the first correction data is correction data for correcting a color change in the image caused by controlling the optical element and the second correction data is correction data for correcting a color change of the image caused by controlling the light source.

5. The image projection apparatus according to claim 1, wherein the processor is further configured to detect a degradation of the light source,
wherein the processor controls at least one of the optical element and the light source so as to suppress a decrease in the light amount entering the optical modulator due to the degradation when the degradation is detected.

6. The image projection apparatus according to claim 5, further comprising a light amount detector configured to detect the light amount of the light source,
wherein the processor detects the degradation when detecting that the light amount has decreased with a predetermined supply of power to the light source.

7. The image projection apparatus according to claim 1, further comprising a temperature sensor configured to detect an internal temperature of the image projection apparatus,
   wherein the processor controls at least one of the optical element and the light source so as to decrease the internal temperature when the internal temperature is higher than a predetermined temperature.

8. The image projection apparatus according to claim 1, wherein the information on the gradation is any one of an averaged gradation level, a gradation histogram, and a maximum gradation value.

9. A control method of an image projection apparatus that includes an optical modulator configured to modulate light from a light source according to an image signal, the image projection apparatus being capable of projecting light modulated by the optical modulator to display an image, the control method comprising:
   changing a light amount emitted from the light source through an optical element;
   acquiring information on a gradation of the image signal;
   correcting the image signal; and
   controlling the light source and the optical element based on the information of the gradation;
   wherein the correcting the image signal corrects the image signal based on first correction data used to correct the image signal in accordance with a change in a light amount caused by controlling the optical element and second correction data used to correct the image signal in accordance with a change in a light amount caused by controlling the light source.

10. A non-transitory computer-readable storage medium for storing a computer program that enables a computer to execute a control method of an image projection apparatus that includes an optical modulator configured to modulate light from a light source according to an image signal, the image projection apparatus being capable of projecting light modulated by the optical modulator to display an image,
   wherein the control method includes:
   changing a light amount emitted from the light source through an optical element;
   acquiring information on a gradation of the image signal;
   correcting the image signal; and
   controlling the light source and the optical element based on the information of the gradation;
   wherein the correcting the image signal corrects the image signal based on first correction data used to correct the image signal in accordance with a change in a light amount caused by controlling the optical element and second correction data used to correct the image signal in accordance with a change in a light amount caused by controlling the light source.

* * * * *